(No Model.)
W. T. WILLIE.
DISH CLEANER.
No. 556,604. Patented Mar. 17, 1896.
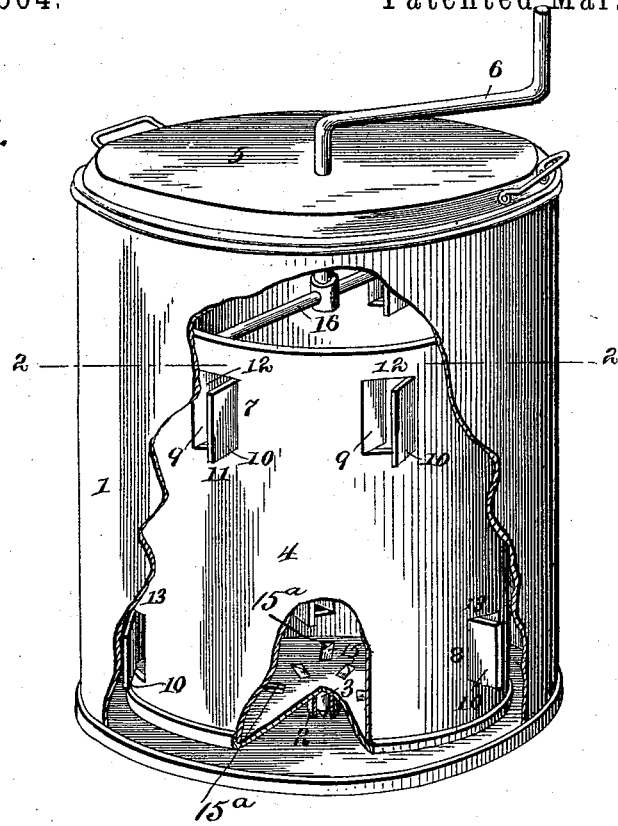
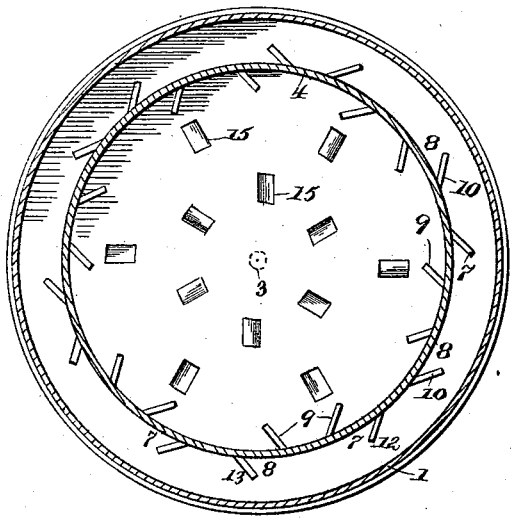
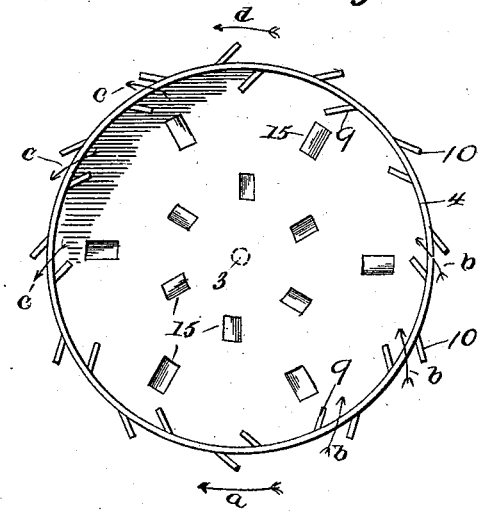
Witnesses:
Howard D. Orr.
A. R. Brown
Inventor:
William T. Willie
By Chas. J. Gooch
his Atty.

UNITED STATES PATENT OFFICE.

WILLIAM THOMAS WILLIE, OF INDEPENDENCE, TEXAS.

DISH-CLEANER.

SPECIFICATION forming part of Letters Patent No. 556,604, dated March 17, 1896.

Application filed October 8, 1895. Serial No. 565,022. (No model.)

*To all whom it may concern:*

Be it known that I, WILLIAM THOMAS WILLIE, a citizen of the United States, residing at Independence, in the county of Washington and State of Texas, have invented certain new and useful Improvements in Dish-Washers; and I do hereby declare the following to be a full, clear, and exact description of the invention, such as will enable others skilled in the art to which it appertains to make and use the same.

This invention relates to improvements, as hereinafter set forth, in that class of dish-washers in which the articles to be washed are contained in a vessel which is oscillated in an inclosing vessel.

In the drawings, Figure 1 represents a perspective view, partly broken away, of my complete dish-washer. Fig. 2 represents a horizontal section taken on the line 2 2 of Fig. 1. Fig. 3 represents a top plan view of a modification of the dish-holding vessel with the bail omitted.

The object of my invention is to secure the more rapid and thorough cleansing of dishes, tumblers, knives, forks, spoons, and other tableware than has heretofore been obtainable in dish-washers having either closed sides or slotted sides having lips or flanges extending in one direction only.

To this end I construct the inner vessel, which is oscillated in opposite directions, with an upper and a lower series of flange or lip guarded slots or openings in and around its side walls, said flanges or lips extending in series in opposite directions, so as to cause the alternate supply to and discharge of water from the interior of the inner vessel and insure the thorough circulation of such water through the vessel and around and between the articles therein in whichever direction the vessel is oscillated, thereby securing a continuous and rapid circulation of water over and around the articles to be cleaned, whereby their cleansing is most rapidly and thoroughly effected.

1 represents the outer vessel within which is contained the water for washing the dishes or other aticles, as spoons, forks, knives, glassware, and the like. This outer vessel may be of any desired shape, such as circular, as shown, or of square or other angular conformation, as preferred. It is provided with a central step-bearing 2, within which the step or stud 3 depending centrally from the bottom of the inner vessel 4 is received, and oscillates as the said inner vessel 4 is oscillated.

5 represents a lid having a central opening, up through which the operative handle 6, to be presently described, passes.

Circumferentially around the inner vessel are formed an upper series, 7, and a lower series, 8, of vertical slots or openings, each of which openings has, respectively, an outwardly-extending and also an inwardly-extending lip or flange formed by bending the slit portions of the vessel-body to form the slots, the inwardly-extending lips or flanges 9 extending from one side edge of the slotted portions, and the outwardly-extending lips or flanges 10 extending from the other side edge thereof, as shown. The direction of the angular extension of these lips or flanges may be variable. For instance, the upper series may all extend outwardly in one direction, as shown at 11, and inwardly in the reverse direction, as shown at 12, and the lower series of lips or flanges may extend outwardly in a direction the reverse of that of the upper series, as indicated at 13, and the inwardly-extending lips of said lower series extend in the reverse direction, or a portion of each of said upper and lower series may, as shown in Fig. 3, extend in one direction, and a portion in the opposite direction.

The result obtained by extending the several lips or flanges guarding the respective slots in opposite or reverse directions is that when the vessel containing the articles to be washed is oscillated in the direction of the arrows *a* water from the outer vessel will impact against the inner faces of those outer lips, extending in the direction of the movement of said inner vessel and be drawn within said vessel, as shown by the arrows *b*, the flow of water into said vessel being additionally guided by the adjacent inwardly-extending lips or flanges, the water entering at such points by the centrifugal action passing through the contents of the vessel and out through the slots or openings guarded by the lips or flanges extending at reverse angles to those at which the water enters, as shown by the arrows *c*. When the inner vessel is oscillated in the reverse direction, as shown by arrow $d$, the water will enter those openings which previously operated as discharge-openings, and will discharge through the former receiving-openings. These operations are identical, whether the outwardly-extending flanges of the upper series all extend in one direction and the outer flanges of the lower series extend in the reverse direction, or whether a part of both the upper and also of the lower series extend in one direction and a part thereof of each, respectively, extend in the opposite direction. In each construction the same result is attained—namely, the guiding of the water into and out through the inner vessel at each to-and-fro oscillation thereof in strong and vigorous continuous currents without cessation during the movements of the vessel, through said vessel and between and over each article therein, thereby speedily and thoroughly cleansing said articles.

15 represents a series of openings in the bottom of the inner vessel for the purpose of assisting in the circulation of the water, and also of securing the drainage thereof from the inner vessel when raised to remove the contents. $15^a$ represents lips guarding said openings 15.

16 represents a bridge or bail secured to and extending horizontally across the top of the inner vessel, and 6 represents an operative handle, which is secured to said bail and extends up through the cap or cover 5, as shown, said cap or cover being easily removable by sliding the same up and over the top of said operative handle.

Having thus described my invention, what I claim is—

1. A dish-washer consisting of an outer water-containing vessel, an inner dish-holding vessel having a series of side openings, lips extending inwardly from one side of said openings and lips extending in an opposite direction outwardly from the opposite side of said openings, and an operative handle secured to said inner vessel, substantially as and for the purpose set forth.

2. A dish-washer consisting of an outer water-containing vessel having a central step-bearing, and an inner dish-holding vessel having a central depending step, a circumferential plurality of side openings, lips extending inwardly from one side of said openings and lips extending outwardly from the opposite side of said openings, a portion of said outer and inner lips, respectively, extending in an opposite direction to the other portion thereof, a transverse bridge-piece at the top of said inner vessel, and an operative handle secured to said bridge-piece, substantially as and for the purpose set forth.

In testimony whereof I affix my signature in presence of two witnesses.

WILLIAM THOMAS WILLIE.

Witnesses:
A. T. BRYAN,
H. L. WEAVER.